No. 646,775. Patented Apr. 3, 1900.
A. WILDERSPIN.
SALT MAKING APPARATUS.
(Application filed Aug. 14, 1899.)
(No Model.) 4 Sheets—Sheet 1.

WITNESSES:
INVENTOR
ATTORNEY

No. 646,775. Patented Apr. 3, 1900.
A. WILDERSPIN.
SALT MAKING APPARATUS.
(Application filed Aug. 14, 1899.)

(No Model.) 4 Sheets—Sheet 2.

WITNESSES:
Harry King
S. M. McColl

INVENTOR
A. Wilderspin
BY J. C. Jones
ATTORNEY

THE NORRIS PETERS CO., PHOTO-LITHO., WASHINGTON, D. C.

No. 646,775. Patented Apr. 3, 1900.
A. WILDERSPIN.
SALT MAKING APPARATUS.
(Application filed Aug. 14, 1899.)
(No Model.) 4 Sheets—Sheet 3.
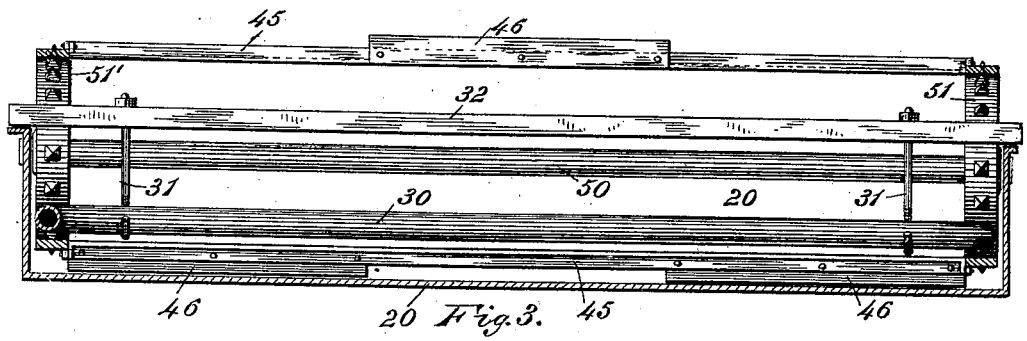
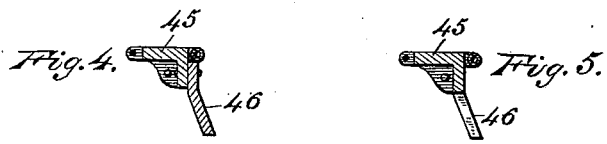
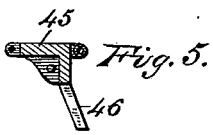
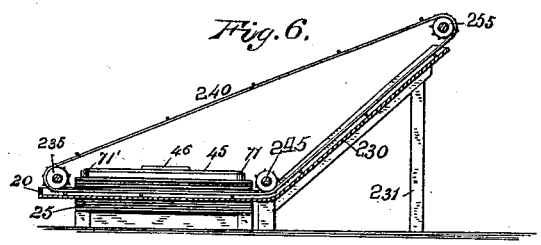
WITNESSES:
INVENTOR
ATTORNEY No. 646,775. Patented Apr. 3, 1900.
A. WILDERSPIN.
SALT MAKING APPARATUS.
(Application filed Aug. 14, 1899.)
(No Model.) 4 Sheets—Sheet 4.
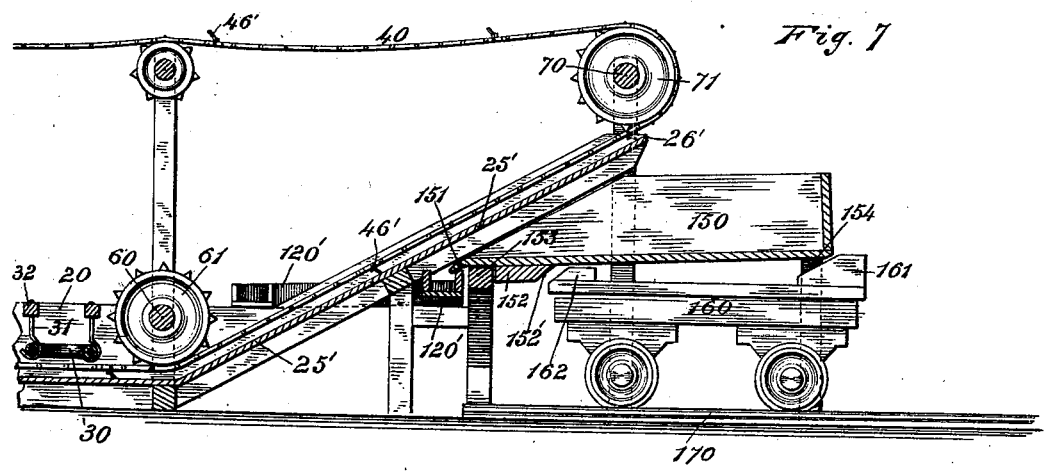
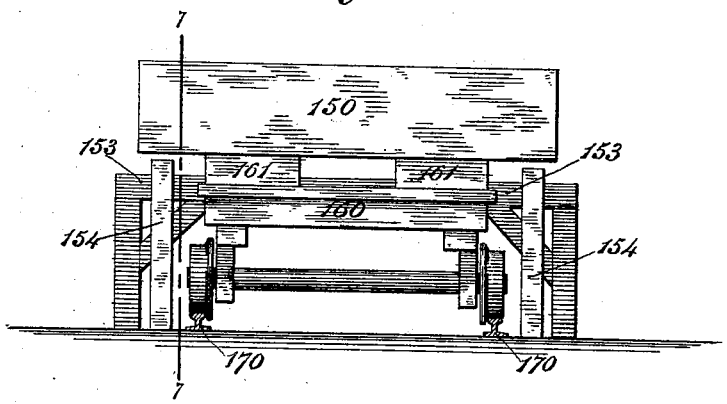
WITNESSES:
Harry King.
S. M. McColl.
INVENTOR
A. Wilderspin
BY
H. C. Somer
ATTORNEY

UNITED STATES PATENT OFFICE.

ANDERSON WILDERSPIN, OF GRAND SALINE, TEXAS, ASSIGNOR OF ONE-HALF TO DAVID C. EARNEST, OF DALLAS, TEXAS.

SALT-MAKING APPARATUS.

SPECIFICATION forming part of Letters Patent No. 646,775, dated April 3, 1900.

Application filed August 14, 1899. Serial No. 727,117. (No model.)

*To all whom it may concern:*

Be it known that I, ANDERSON WILDERSPIN, a citizen of the United States of America, residing at Grand Saline, in the county of Van Zandt, in the State of Texas, have invented certain new and useful Improvements in Salt-Making Apparatus, of which the following is a specification.

This invention relates to an apparatus for the manufacture of salt from salt water by subjecting the water to the evaporating action of artificial heat and collecting the salt precipitated therefrom.

The object of the invention is to provide a simple and convenient apparatus for collecting the precipitated salt and rapidly draining the water therefrom, returning the drained water for reëvaporation, and transferring the salt to the place of deposit.

Figure 1:
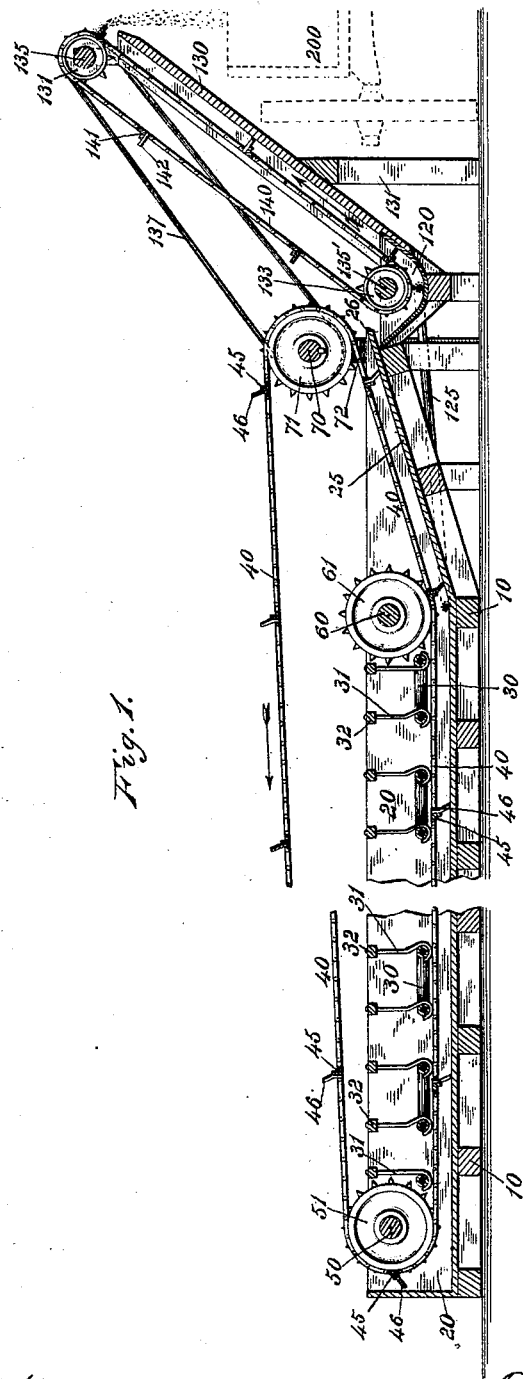
Figure 2:
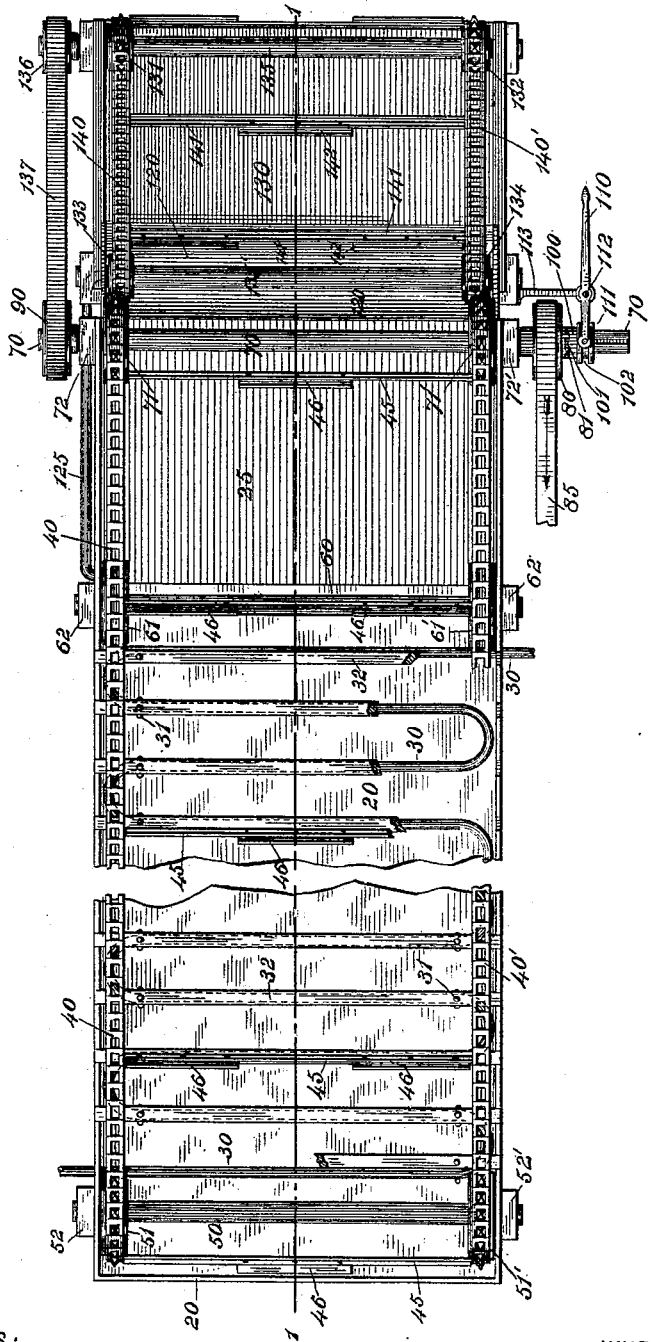

Figure 1 of the accompanying drawings represents a longitudinal vertical section of my improved salt-making apparatus on line 1 1 of Fig. 2, a portion thereof being broken out. Fig. 2 represents a plan view thereof. Fig. 3 represents a transverse section on line 3 3 of Fig. 2. Fig. 4 represents a sectional view of one form of rake-blade riveted to the rake-frame. Fig. 5 represents a similar view of another form of blade. Fig. 6 represents a longitudinal vertical section, on a smaller scale, of an end elevation of the grainer and an elevator for the salt disposed crosswise thereof. Fig. 7 represents, on an enlarged scale, a longitudinal section of one end of the grainer and a receptacle for the salt in the form of a portable bin. Fig. 8 represents an end elevation thereof.

The same reference-numbers indicate the same parts in all the figures.

The salt-pan 20, known in the art as a "grainer," for containing the salt water from which the water is to be evaporated and the salt precipitated in grains, is preferably composed of steel and supported on blocks 10 or other suitable supports, or it may rest directly on the floor or ground. This grainer 20, as shown in the accompanying drawings, is constructed in the form of a rectangular flat-bottomed pan having an inclined end 25. This pan is commonly about eighteen inches deep, ninety feet long, and twelve feet wide; but it may be made in any other desired size.

Any suitable means may be provided for heating the water in the pan to induce evaporation. The means herein shown consists of a serpentine steam-coil 30, suspended in the grainer 20 by means of hooks, as 31, attached to wooden beams 32, which extend across the top of the grainer. This coil is supported a sufficient distance above the bottom of the grainer to allow the raking apparatus to pass thereunder and serves to heat the brine, causing evaporation of the water and a deposit of the salt.

The raking apparatus for agitating the brine and collecting the salt deposited on the bottom of the pan comprises two endless belts 40 and 40', preferably in the form of sprocket-chains, which pass over sprocket-wheels 51, 51', 61, and 61' and over sprocket driving-wheels 71 and 71'. These wheels are disposed, respectively, on shafts 50, 60, and 70, which extend through the sides of the grainer and are journaled in standards 52, 52', 62, and 62'. The shaft 70 extends at each end beyond the sides or the grainer and is supported in standards 72 and 72'. This shaft has mounted thereon a driving-pulley 80, a power-transmitting pulley 90, and a clutch 100.

The chains 40 and 40' are connected by transverse rake-frames 45, preferably composed of angle-irons. Rake-blades, as 46, are so disposed on these rake-frames that one blade extends over a part of the grainer and the blade on the adjacent rake-frame over another part thereof, and so on in staggered arrangement throughout the length of the chains. This arrangement of the blades 46 enables them to thoroughly scrape the entire bottom of the grainer, permits the free passage of water between the blades along the bottom of the pan, and insures an effectual drainage of the water from the salt as it travels up the incline 25.

The driving-pulley 80, disposed on the shaft 70, is connected by a belt 85 to any suitable source of power. This pulley 80 is provided at one end with teeth, as 81, which are normally engaged by the teeth 101 of the clutch 100, which is splined on the shaft 70. This pulley when connected to the clutch rotates the shaft 70 and imparts motion to the driving sprocket-wheels 71 and 71' thereon, which engage the sprocket-chains 40 and 40' and operate the raking apparatus. A clutch-lever 110 is pivoted at 112 to an arm 113, extending out from the side of the grainer, and is provided with a fork 111, which engages a peripheral groove 102 in the clutch 100.

In the apparatus shown in Figs. 1 and 2, a trough 120 is disposed adjacent to the outer end of the incline 25 and preferably extends the full width of the grainer. This trough receives the salt from the rakes 46, which sweep it up the incline 25 and over the edge 26 thereof into said trough. The salt deposited in this trough by the rakes 46 is picked up by the rakes of the elevating apparatus hereinafter described and dumped into a cart or other receptacle. This trough 120 is also disposed adjacent to and directly under the elevator and catches the drippings of brine from the salt as it travels up the elevator. A pipe 125 connects the trough 120, preferably at or near the bottom thereof, with the grainer 20 and serves to convey the brine collected in said trough back to the grainer, where it is again subjected to the evaporating operation.

The elevating apparatus comprises an upwardly-inclined pan 130, open at both ends and supported on a frame 131 or in any other suitable manner. Shafts 135 and 135' are suitably supported, one at the top and the other near the bottom of the pan. Sprocket-wheels 131, 132, 133, and 134 are disposed on said shafts, and sprocket-chains 140 and 140', similar to the chains 40 and 40', pass over these wheels and are connected by rods 141, having rake-blades 142 staggered thereon, similar to the blades 46 of the grainer raking apparatus. The shaft 135 has a pulley 136, which is connected by a belt 137 to a motion-transmitting pulley 90 on the driving-shaft 70 of the grainer, whereby motion is imparted to the elevating-rake.

In the use of the apparatus shown in Figs. 1 and 2 the pan or grainer 20 is filled, or partially filled, with salt water from which the salt is to be separated. Steam is then turned into the serpentine coil 30 and circulates therethrough, whereby the brine or salt water is heated and the precipitation of the salt in crystals facilitated. The raking apparatus is put into motion by switching the clutch-lever 110 into position so that the teeth 101 of the clutch 100 engage the teeth 81 of the driving-pulley 80, which rotates the shaft 70, carrying the sprocket-wheels 71 and 71' thereon. These sprocket-wheels engage the chains 40 and 40' and cause them to move thereover, whereby the rake-blades 46 are moved continuously in the direction of the arrow. These blades 46 scrape the salt from the bottom of the grainer and carry it up the incline 25 until it reaches the edge 26 thereof, where it is pushed over said edge into the trough 120. The salt deposited in the trough 120 is then picked up by the rakes 142 of the elevating apparatus and travels up the inclined pan 130 until it reaches the top thereof, where it is pushed over the edge of the pan 130 by the moving blades 142 and falls into a cart 200 or any other receptacle. It is then carried off and packed in suitable vessels for shipment. The drippings of brine collected in the trough 120 return to the grainer through the pipe 125, where they undergo a further evaporating process.

In Fig. 6 the elevating apparatus is shown disposed transversely to the grainer, at one end thereof. The trough 220 is flat-bottomed and adapted to receive the salt from the inclined end 25 of the grainer, and it is provided with an inclined end 230, extending laterally of the whole apparatus and supported on a frame 231. The endless rake 240 in this case is supported on sprocket-wheels disposed on the shafts 235, 245, and 255.

In Figs. 7 and 8 the receptacle or means for receiving the salt from the grainer is shown in the form of a portable bin 150, supported at one end on a cross-bar 153 and at the other end on props or legs 154. This bin is inclined from the rear toward the front thereof and has its sides beveled to fit under the elongated incline 25' of the grainer 20. The front end of the bin is provided with a lip 151, which projects over the edge of a trough 120', said trough being preferably made U-shaped in form and adapted to extend around the incline 25' and empty into the grainer. Blocks, as 152, having beveled faces, as 152', are disposed on the bottom of the bin, near the front thereof, and abut against the cross-beam 153, whereby the bin is held firmly in position and prevented from sliding down over and covering the trough 120'. This portable bin 150 may be removed in any desired manner. The means herein shown comprise a carriage 160, disposed on rails 170 and extending under the bin 150. To prevent the salt from falling out of the bin during the removal thereof, the carriage 160 is provided with beveled blocks 161 and 162, disposed near the front and back thereof, respectively. The blocks 161 are disposed at the rear of the truck and made larger than the blocks, as 162, so that when it is desired to remove the bin, the carriage 160 being impelled to its forward position under the bin, the beveled faces of the blocks 161 come in contact with the rear end of the bin and raise it out of contact with the props 154 and the beveled faces of the blocks, as 162, engage the beveled faces 152' of the blocks, as 152, on the bottom of the bin and raise the front end of the bin from the cross-beam 153, whereby the weight of said bin is transferred from said cross-beam and props to the carriage 160, and the front end of the bin is sufficiently tilted to prevent the salt from falling out of said front end during its removal.

In the use of the apparatus shown in Figs. 7 and 8 the salt precipitated in the bottom of the grainer is carried by the staggered rake-blades 46' up the elongated incline 25' and passes over the edge 26' thereof into the bin 150, and any brine carried over the edge with the salt runs down the tilted bin toward the front thereof and flows into the trough 120' over the lip 151 and is conveyed back to the grainer and there subjected to a second evaporating operation. This bin may be removed when desired and another substituted therefor and the salt-making operation continued indefinitely without interruption.

I claim as my invention—

1. A salt-raking apparatus comprising suitably-supported endless belts, rake-frames connecting said belts, and rake-blades disposed in staggered position on said frames.

2. A salt-raking apparatus consisting of suitably-supported endless belts, rake-frames connecting said belts, and rake-blades disposed in staggered position on said frames, one frame having blades disposed at opposite ends thereof, and the next adjacent frame having a single blade disposed in the center thereof and so on throughout the length of the belts.

3. The combination of a salt-grainer, a raking apparatus connected therewith, a receptacle for receiving the salt from said grainer, a trough disposed adjacent to said receptacle and adapted to collect the drippings of brine therefrom, means for supporting said receptacle at an incline toward said trough, a carriage for transferring said receptacle, and means on said carriage and receptacle for tilting the latter into reverse position.

4. The combination of a salt-grainer, a raking apparatus connected therewith, a receptacle for receiving the salt from said grainer, a trough disposed adjacent to said receptacle for collecting the drippings of brine therefrom, a carriage for engaging and moving said receptacle, and beveled blocks on said carriage and receptacle for tilting the latter into transferring position.

5. The combination of a salt-grainer, a raking apparatus connected therewith, a portable receptacle for receiving the salt from said grainer, stationary supports for holding said receptacle in position to receive the salt from said grainer, and a carriage adapted to move between said stationary supports for engaging said receptacle and transferring it.

ANDERSON WILDERSPIN.

Witnesses:
A. FIELDU,
D. E. WALSHE.